March 8, 1949.   C. A. DE GIERS ET AL   2,463,681
RATIOMETER
Filed June 19, 1945   3 Sheets-Sheet 1

INVENTORS
CLARENCE A. DE GIERS
ABRAHAM EDELMAN
BY
Ernest D. Given
ATTORNEY

March 8, 1949.   C. A. DE GIERS ET AL   2,463,681
RATIOMETER
Filed June 19, 1945   3 Sheets-Sheet 2
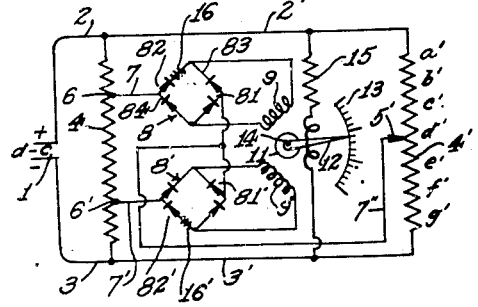
Fig. 8.
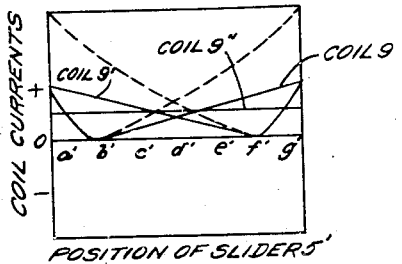
Fig. 9.
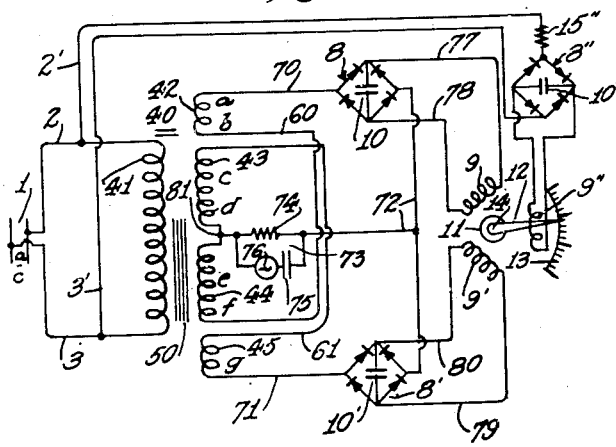
Fig. 11.
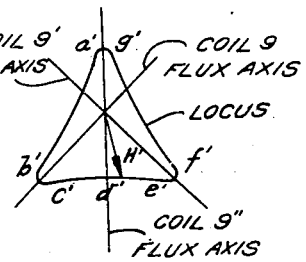
Fig. 10.
Fig. 13.
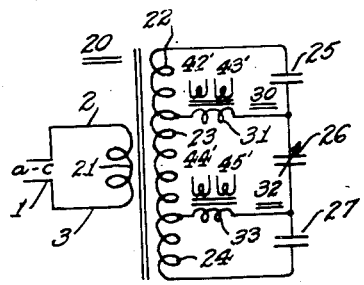
Fig. 14.
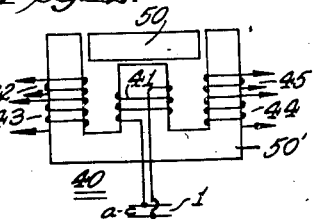
Fig. 12.
INVENTORS
CLARENCE A. DE GIERS
ABRAHAM EDELMAN
BY
Ernest D. Given
ATTORNEY March 8, 1949.　　C. A. DE GIERS ET AL　　2,463,681
RATIOMETER Filed June 19, 1945　　3 Sheets-Sheet 3

POSITION OF SLIDING CONTACT 5'
WITH CLOCKWISE ROTATION OF SLIDER →

POSITION OF SLIDING CONTACT 5'
WITH CLOCKWISE ROTATION OF SLIDER →

INVENTORS
CLARENCE A. DE GIERS
ABRAHAM EDELMAN
BY
Ernst D. Givn
ATTORNEY

Patented Mar. 8, 1949

2,463,681

UNITED STATES PATENT OFFICE 2,463,681

RATIOMETER

Clarence A. de Giers, Forest Hills, and Abraham Edelman, New York, N. Y., assignors to The Liquidometer Corporation, Long Island City, N. Y., a corporation of Delaware Application June 19, 1945, Serial No. 600,362

9 Claims. (Cl. 177—351)

This invention relates to circuit arrangements for indicating and control devices, with particular reference to ratiometers, Selsyn motors, position indicators, etc. In all circuits for such devices, the position of a transmitting element is translated into electrical signals which then operate a receiving element so that the latter assumes a position related to that of the transmitting element.

One of the objects of the invention is to increase the movement of the receiving element that results from a movement of the transmitting element.

Another object of the invention is to reduce the number of wire connections that are required between the receiving element and the transmitting element.

Another object of the invention is to provide a means for creating new relationships between the movement of a transmitter element and the resulting movement of a receiver element.

Another object of the invention is to provide a telemetering or position indicating circuit which can revolve the indicating pointer through a wide angle of rotation, even exceeding one revolution, as the result of a simple unidirectional change in the magnitude of an electrical quantity in the transmitter element.

Another object of the invention is to provide a circuit means for creating many novel useful relationships between the movement of a transmitter element and the rotation of a magnetic field vector.

Another object of the invention is to provide a circuit means for creating many novel useful relationships between the movement of a transmitter element and the changes in several currents in parts of a circuit employed for measurement or control.

Another object is to provide a circuit arrangement suitable for telemetering the position of a member in an airplane structure by reading wide-angle indications at a distant indicating instrument.

Other and further objects and advantages of the invention will be hereinafter described and other features thereof set forth in the appended claims.

According to a now preferred embodiment of the invention, the previously mentioned and other objects hereinafter described are attained by including in a circuit system of the type described polarity-sensitive impedances or resistances which change the trend of variation of the currents controlling the receiving element in such a manner that the movement of the receiving element, in response to a given movement of the transmitting element, has the desired characteristics, for instance is increased in response to a given movement of the transmitting element. For these purposes, the polarity-sensitive impedance, usually a resistance may be considered as a switch which passes current when the polarity across itself is in the "forward" direction, and which reduces the current to a negligible minimum when the polarity across itself is in the "reverse" direction. Such polarity-sensitive impedances are well known in the electrical art, as mentioned hereinafter.

Referring to the drawings which illustrate possible and preferred embodiments of the invention, but to which the invention is by no means restricted since the drawings are merely shown by way of illustration and not by way of limitation.

Fig. 5 shows the trends of current changes with slider position in a circuit according to Figs. 4 and 4a;

Fig. 7 shows the trend of the resulting magnetic flux controlling the rotor movement in a circuit according to Fig. 4a;

Fig. 8 shows a modification of Fig. 4a;

Fig. 9 shows the trends of current changes with slider position in a circuit according to Fig. 8;

Fig. 10 shows the trends of the resultant magnetic flux controlling the rotor movement in a circuit according to Fig. 8;

Fig. 11 shows another modification of the invention employing an inductive transmitter;

Fig. 12 shows diagrammatically the design of an inductive transmitter as may be used in a circuit system according to Fig. 11;

Fig. 13 shows the trends of voltage changes in the output of the inductive transmitter of Figs. 11 and 12;

Fig. 14 shows another modification of the invention employing a capacitative transmitter;

Figure 1:
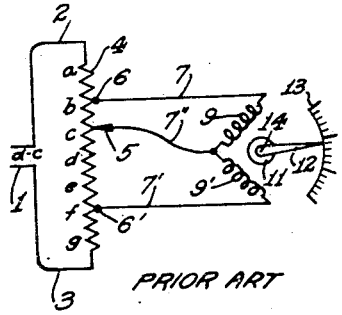
Fig. 1 shows a typical circuit system as used in conventional position indicators.

Fig. 1 illustrates a simple type of a conventional circuit system, shown for comparison with later figures which embody features of the invention. Referring to Fig. 1 a source 1 of D.-C. electric energy is connected by wires 2, 3 to the ends of a resistance strip 4. A slider 5 is caused to move along the strip 4 by some external means such as a prime mover. The strip 4 and slider 5 may hereinafter be referred to as a "transmitter" since it is their function to follow the movements of the above mentioned external means with related movements of the slider, and to transmit electrical signals corresponding to such movements.

Taps 6 and 6' on strip 4 are connected by wires 7 and 7' to the outer ends of coils 9, 9' respectively, while slider 5 is connected by a wire 7'' to a junction between the inner ends of coils 9, 9' of a ratiometer. These coils are symmetrical and placed so that their magnetic flux may act upon a permanent magnet rotor 11 mounted on a rotatable shaft 14, and magnetized across a diameter. This shaft also supports a pointer 12 which indicates the rotation of shaft 14 and rotor 11 upon the dial and scale 13.

It should be noted that an A.-C. source may also be employed. Then the permanent magnet rotor 11 may be replaced by a soft iron rotor so that it may reverse its polarity. Numerous variations, including a winding for the rotor, are well known in the art.

Figure 2:
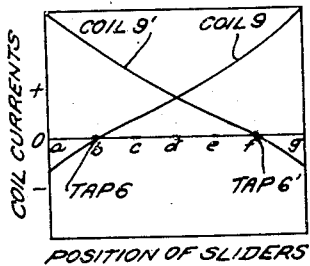
Fig. 2 shows the trends of current changes with slider position in a circuit according to Fig. 1.
Figure 3:
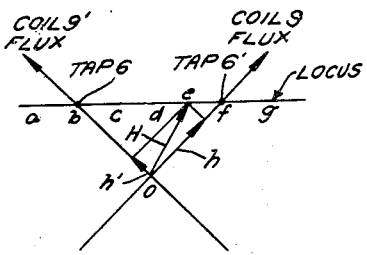
Fig. 3 shows the trends of the resultant magnetic flux controlling the rotor movement for Fig. 1.
Figure 5:
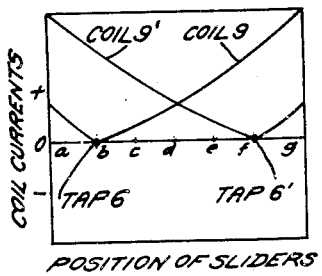
Figure 6:
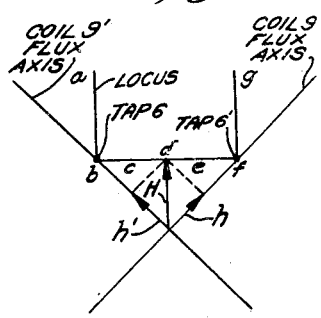
Fig. 6 shows the trends of the resultant magnetic flux controlling the rotor movement in a circuit according to Fig. 4.

To explain the normal operation of the circuit of Fig. 1 and circuits described hereinafter, charts of current variation with slider position are shown. Fig. 2 is such a chart, prepared for the circuit of Fig. 1, while Fig. 5 is a similar chart prepared for the circuit of Fig. 4. In addition, charts illustrating how the magnetic flux from the coils are combined to show the resultant magnetic flux acting upon the rotor have been provided. Fig. 3 is such a chart for the circuit of Fig. 1, and Fig. 6 is a similar chart for the circuit of Fig. 4.

Referring first to Figs. 1, 2, 3, let it be assumed that the slider 5 moves from one extreme position on strip 4 to the opposite extreme position; then the currents through coils 9, 9' will vary in approximately straight line manner, the current through each coil passing through zero when the slider engages a tap 6 or 6' on the strip, and reversing its direction as the slider passes over either one of these taps (see Fig. 2). The coil currents as charted in Fig. 2 vary from a straight line more or less according to the selected values of resistance in the circuit. For purposes of general explanation it may be assumed that they are approximately straight line variations. It has been found by trial that this approximation will not produce serious errors in the analysis.

Fig. 3 shows two axes intersecting at point 0, which represents the center 14 of the rotor location in Fig. 1. The two axes represent the directions of the magnetic flux from the coils 9, 9' as they occur at the point 0. These directions do not change with the position of the slider 5, but are determined only by the locations of the coils around the rotor. In Fig. 3 it has been assumed that the coils are displaced around the rotor 90° apart, so that their magnetic flux axes require to be displaced 90° from each other. It should be understood that if the coils are displaced at any other angle, then the magnetic flux axes will be required to be shown displaced at the same new angle.

A vector $h$ may be drawn along the axis for coil 9 to represent the magnitude as well as the direction of the flux from that coil. The magnitude will be proportional to the coil current, and may be taken from Fig. 2. Similarly, a vector $h'$ may be drawn for the flux from coil 9'. For each position of the slider 5, the two vectors may be added together vectorially, and it will then be found that the resultant magnetic flux at the rotor center 14 will be represented by a vector $H$ which is the resultant of vectors $h$ and $h'$ and starts at 0. If all possible vectors $H$ for the various positions of slider 5 are plotted, it will be found that they all start at 0 and terminate upon the line marked "locus" in Fig. 3, and that this locus is approximately a straight line. In order that certain positions of the slider 5 may be coordinated with certain coil current and vector $H$ values, corresponding letters $a$, $b$, $c$, etc. are employed in all figures.

In many designs of indicators for which this circuit may be used, the permanent magnet rotor will turn into the direction of the magnetic field vector $H$, since this is the direction of the magnetic field at its central position. In other indicators, the rotor will turn into a direction dependent on the direction of the vector $H$, but not necessarily in the same direction. Sometimes, the magnetic field vectors for locations adjacent to the center of the rotor will have a large influence. For the present purposes, it will be assumed that the direction of vector $H$ is the direction into which the rotor turns, and that it is also the direction of the pointer 12. It has been found that this assumption will permit explanations to be simplified, and that the important factors in the discussion will not be unduly influenced.

As a result, the locus of Fig. 3 indicates the direction of the pointer by the direction of the vector $H$ at each point of the locus, and the magnitude of the force with which the pointer may be required to turn into this direction against friction and outside forces is indicated by the length of the vector $H$. Fig. 3 shows that for the circuit system of Fig. 1, the locus is essentially a straight line. Obviously, therefore, the extreme maximum of rotation of the pointer, corresponding to the limits of rotation of the vector $H$, might encompass as much as 180°; but there is a practical maximum in the neighborhood of 150° or even 120°. If the circuit constants are varied to bring the maximum nearer to 180°, then the length of vector $H$ at the center position $d$ is required to be reduced, which is undesirable. Also, the rotation of vector $H$ for a given small movement of the slider 5 is very large in the vicinity of the center position d, and diminished rapidly toward the outer positions a and g so that there is little resemblance between the initial movement and the resulting indication.

Figure 4:
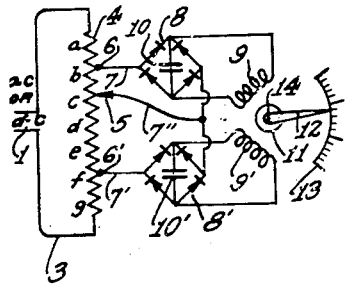
Fig. 4 shows a circuit employing full wave rectifiers according to the invention for the circuit system of Fig. 1.

Referring now to Fig. 4, it will be observed that the same reference characters have been employed as in Fig. 1 for the same parts. The circuit shown in Fig. 4 is distinguished from Fig. 1 by arranging each coil 9, 9' respectively within a conventional full-wave rectifier bridge 8, 8'. A filter condenser 10, 10' respectively may be connected in parallel with each coil, if desired. The filter condenser is not required when the source 1 electric energy is D.-C. as shown in Fig. 1, but since the circuit of Fig. 4 is usable on A.-C. as well as on D.-C., the filter condenser is shown in Fig. 4 so that the current in coils 9, 9' may be converted into reasonably pure D.-C. As a result of the inclusion of polarity-sensitive resistors formed by the rectifier bridges 8, 8' in the circuit, the currents in the coils 9, 9' will now vary as shown in Fig. 5, without regard to whether the source 1 is A.-C. or D.-C. The principal change to be observed from the previous pattern of currents variations shown in Fig. 2 is that the currents no longer reverse in direction when they come to zero at the taps 6, 6', but instead reverse in "trend" and remain positive.

Fig. 6 shows the effect of these current trend changes on the locus of vector H. The change in the trend of the current variations shown at slider positions b and f has resulted in a corresponding bend in the locus at each of these points. As a result, the variations of vector H now follow a U-shaped pattern.

Figure 4A:
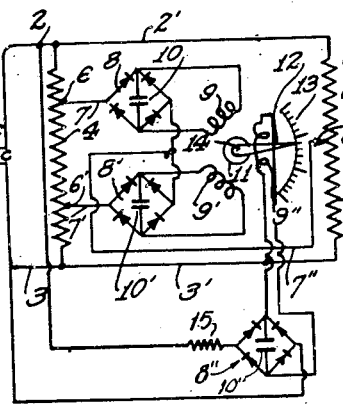
Fig. 4a is a modification of the circuit system shown in Fig. 4.

Referring now to Fig. 4a, it will be observed that the circuit system shown in this figure is distinguished from the one shown in Fig. 4 by substituting resistor 4' as transmitter resistor in place of resistor 4. The advantage gained is that less wires are required between the new transmitter 4' and the receiver elements of the circuit, since the taps (6, 6') are now at a resistor (4) contained with the receiver and not necessary for the transmitter resistor (4'). Furthermore, by varying the resistance in transmitter resistor 4' relative to that of resistor 4, useful variations in the amount of rotation of the rotor with each slider position are obtainable. By adding coil 9" and current-limiting resistor 15, a third vector h" (see Fig. 7) is added to vectors h, h', so that the resultant of all three is vector H'. The third coil 9" receives a steady direct current through a full wave bridge rectifier 8" and filter condenser 10", the A.-C. input of which is in series with a current-limiting resistor 15 and the input being connected to line wires 2 and 3 connected across the supply 1. This circuit arrangement is the same as that shown as a part of Fig. 11 hereinafter described. Since h" is a vector constant in direction and magnitude and also is not influenced by the position of slider 5' (corresponding to slider 5), it has the simple effect of shifting the entire locus downward in Fig. 7 by an amount proportional to the magnitude of h". It will be observed that the direction of h" is downward because that direction corresponds to the position around rotor 11 shown for coil 9" in Fig. 4. Coil 9" is placed symmetrically with respect to coils 9, 9', and the downward direction of h" in Fig. 7 is symmetrical in a similar manner to the directions selected for h and h'.

Figure 7:
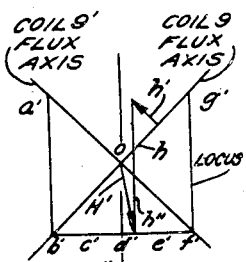

In Fig. 7, the portions of the locus a'—b' and f'—g' are shown lengthened until they meet the magnetic flux axes for coils 9, 9'. This is a matter of choice, since these portions of the locus may be made shorter or longer by varying the locations of taps 6, 6' on resistor 4.

As a result of the changes made in the circuit, the vector H' now rotates through 270°, this being the extent to which the locus of Fig. 7 surrounds the central position 0. Furthermore, the changes in the length of this vector are much smaller than have been shown in Fig. 3 for the circuit of Fig. 1, so that the influence of friction and similar unwanted forces is more uniform throughout the range of movement of the pointer. It has also been found that the sensitivity and degrees of rotation of the vector H' per unit of resistance of the transmitter resistor 4' are capable of being controlled in various useful ways, by adjustment of the resistances in the circuit system of the location of the taps 6, 6'.

By the modification of the circuit of Fig. 4, as shown in Fig. 8, still different and useful results are obtainable. The circuit of Fig. 8 is the same as the circuit of Fig. 4a except that two resistors 16, 16' are included in the rectifier bridges, in series with one arm of each bridge (filters 10, 10' are not shown since a D.-C. source of electrical energy is shown).

Fig. 9 illustrates the result of including these resistors on the coil currents, and should be compared with Fig. 5. Fig. 9 applies only when D.-C. of the polarity indicated is furnished to the circuit, or in other words, advantage of the modification of Fig. 8 is present only when the circuit is operated on D.-C.

Referring now specifically to Fig. 8, let b' on transmitter 4' be so selected that when slider 5' is at b', the slider 5' is at the same potential as tap 6, so that there is no voltage across the bridge rectifier 8. Then if the slider 5' is moved toward a' on the transmitter 4', so that the slider is more positive than tap 6, current will pass through coil 9 by way of bridge arms 83, 84. However, if the slider 5' is moved toward g' on the transmitter 4', so that slider 5' is less positive than tap 6, current will pass through coil 9 by way of bridge arms 81, 82, including resistor 16. Thus, the resistor 16 influences the coil current 9 only for slider positions between b' and g'. Similarly, the current through coil 9' is influenced by resistor 16' for slider positions between a' and f'. This is shown in Fig. 9, in which the dotted lines reproduce the currents that would flow if resistors 16, 16' were omitted, and the solid lines represent the current flow with the resistors present. A desirable value of resistance in resistors 16, 16', is such as to reduce the coil currents to the approximate relative values that are shown in Fig. 9, whereby the current in coils 9, 9' are equal at a', d', g'. The currents in coil 9' are shown in Fig. 9 as having a substantially constant value throughout all slider movements, part way between the maximum value of coil currents 9, 9', and their value when equal at d'.

If these coil currents are now transferred to the magnetic flux axes for coils 9, 9', 9" shown in Fig. 10, and added together vectorially for each position of the slider 5', then it will be found that the locus of the resultant magnetic flux vector H' is a closed figure as a slightly reentrant triangle as shown in Fig. 10. As a result, the pointer of the indicator is caused to traverse 360° while the slider 5' moves from one extreme to the other.

In circuits of the types described, a pointer control device such as a weak permanent magnet is sometimes incorporated into the indicator for the purpose of giving definite position to the pointer when the currents are all switched off, and in such event, it is desirable that the locus encompass about 300° or 330°, instead of 360°, so that there will be a small off-scale region for the pointer to travel to when the power is switched off. This is readily obtained by varying resistances in resistors 16, 16' to a slightly smaller value than shown for Fig. 9 and Fig. 10, whereby the locus of H' does not fully close on itself.

For circuits that operate on A.-C., it is advantageous to replace the resistance strip 4' with an inductance device employed as a transmitter, as shown in Fig. 11, or with a capacitance device employed as a transmitter as shown in Fig. 14 subsequently described. It should be understood that the principles employed in the circuits set forth herein are applicable to all types of electrical transmitters of signals, and those shown and described are merely by way of illustration.

Referring now to Figs. 11 and 12 in detail, a source of A.-C. electric energy indicated at 1 is connected by wires 2 and 3 to the primary winding 41 of an inductance type transmitter generally designated 40, and shown in a particular embodiment in greater detail in Fig. 12. The inductance transmitter includes four secondary windings designated 42, 43 on one side, and 44, 45 on the opposite side. A sliding armature 50 is caused to be moved by some external means such as a prime mover, for example, a float floating on a liquid the depth of which is to be measured by indicating the position of the float through the operation of the circuit system. In Fig. 11, armature 50 is assumed to move vertically, thereby increasing the coupling between primary 41 and secondaries 42, 43 when it moves upwardly and simultaneously decreasing the coupling between primary 41 and secondaries 44, 45. Similarly, when armature 50 moves downwardly, the reverse variation in coupling is caused. In Fig. 12, armature 50 moves horizontally within the limits permitted by the conventional E-shaped magnetic framework 50' while remaining approximately in contact with the central arm of the E-laminations throughout its movement. Armature 50 may be guided in its path by conventional non-magnetic guides if desired (not shown in the figure). In both, Fig. 11 and Fig. 12, it is obvious that the effect of a movement of the armature is to vary the coupling as explained above, and therefore to vary the secondary voltages correspondingly.

Further describing the circuit arrangement shown in Fig. 11, secondaries 42 and 44 are connected in series opposed by a wire 60; and secondaries 43 and 45 are connected in series opposed by a wire 61. Secondaries 42, 45 have half as many turns as secondaries 43, 44. Secondary 42 is also connected by a wire 70 to an A.-C. terminal of full-wave bridge rectifier 8, thereby supplying by wires 77, 78 direct current to coil 9, filtered by condenser 10 as in the previously described circuit arrangements. Similarly, secondary 45 is connected by a wire 71 to an A.-C. terminal of full-wave bridge rectifier 8', thereby supplying by wires 79, 80 direct current to coil 9', filtered by condenser 10'. The remaining A.-C. terminals of rectifiers 8, 8', are joined and connected by a wire 72 to a phase shifting network generally designated 73, and from network 73 to a junction point 81 between secondaries 43 and 44. The phase shifting network includes a resistor 74 in parallel with a series combination of a condenser 75 and an A.-C. voltage 76. The A.-C. voltage 76 may be taken from a transformer secondary (not shown) the primary of which is across the A.-C. source. The purpose of the phase shifting network is to make it possible for coil currents 9, 9' to come to zero at certain positions of the armature 50, as will be shown later. There are, of course, numerous alternative phase shifting networks suitable for this purpose also.

The various positions of the armature 50 are shown in Fig. 11 by letters a, b, c, etc., distributed along the path of the armature to indicate positions corresponding to the same letters in Fig. 13 showing the trend of voltage changes in the output of the inductive transmitter. Due to the small movement shown in Fig. 12 for the corresponding armature movement, the letters are omitted in this figure, but it should be understood that they might be entered, space permitting.

Fig. 13 shows how the secondary voltages generated in the secondaries 42, 43, 44, 45 change with armature positions. Secondary voltages for windings 42, 45 are respectively half as large as those for windings 43, 44 because there are half as many turns on these windings as previously mentioned.

Referring again to Fig. 11, secondaries 42 and 44 are connected in series opposed, as previously explained, so that their voltages (which are approximately in phase when equal) may balance against each other. Similarly, secondaries 43, 45 are connected in series opposed, so that their voltages may balance against each other; these voltages are also approximately in phase when equal in magnitude. For such series opposed connections of the secondary windings, and including the influence of the phase shifting network 73, the net voltages appearing for each combination of two secondaries across the A.-C. terminals of the bridge rectifiers 8, 8' are shown in Fig. 13 by the voltage variation graphs labeled 44—42 and 43—45 respectively. These voltages are the differences between the respective secondary voltages, and determine the flow of current in each of the two rectifier and coil circuits shown in Fig. 11. Experiment shows that the A.-C. currents in wires 70 and 71, and the D.-C. currents in coils 9 and 9' do in fact vary in the same manner as shown by voltage lines 44—42 and 43—45 of Fig. 13.

As will be observed the currents shown in Fig. 5 for the circuits of Figs. 4 and 4a are very much like the voltages shown in Fig. 13 for the circuit of Fig. 11; and as a result the type of locus for the resultant, magnetic flux vector as shown in Fig. 6 is the same for both circuits. Furthermore, by the addition of the third coil 9'', receiving a steady direct current through full-wave bridge rectifier 8'' and filter condenser 10'' in series with current-limiting resistor 15'', fed from wires 2', 3' connected across the A.-C. supply 1, the locus for this circuit may be shifted identically as before, so that Fig. 7 applies equally well to this modified circuit, and all of the remarks made about this 270° locus apply equally well for the modified circuit of Fig. 11.

It will now be understood that if rectifiers had not been employed, the A.-C. currents which would then be available for the operation of an A.-C. type indicator would not change their "trend" as the armature passes through positions b and f, but would instead reverse their polarity and so maintain the same trend. By so doing, the locus would have remained a straight line locus, as shown in Fig. 3, and the rotation of the pointer would not have been as large or as uniform.

Fig. 14 illustrates a capacitance form of transmitter. A source of A.-C. is indicated at 1, connected by wires 2 and 3 to the primary winding 21 of a transformer 20, which has three equal secondary windings 22, 23, 24, connected in series. Three capacitors 25, 26, 27 are connected in series between the outer terminals of secondary windings 22 and 24 as shown. The junction between windings 22, 23 is connected to the junction between capacitors 25, 26 through the primary winding 31 of a transformer 30. The junction between windings 23, 24 is connected to the junction between capacitors 26, 27 through the primary winding 33 of another transformer 32. Transformer 30 has secondary windings 42', 43', and transformer 32 has secondary windings 44', 45'. The transformer secondaries 42', 43', 44', 45' are to be compared with the secondaries 42, 43, 44, 45 of Fig. 11, and are wound to have the same relative number of turns per winding. Capacitor 25 is given a value of capacitance somewhat different from that of capacitor 27; for example, 75% of the capacitance value. Capacitor 26 is considered as a transmitter capacitor, and has a variable capacitance controlled by a prime mover, for example, a float floating on liquid, the depth of which is to be indicated through the electrical circuit being described. Capacitor 26 is to have a capacitance which varies between limits which are the capacitance values assigned to capacitors 25 and 27 respectively.

In operation, the circuit performs as follows: The A.-C. source furnishes three equal voltages in phase with each other across the three secondaries 22, 23, 24. These voltages add to drive a capacitative current through the three capacitors 25, 26, 27 in series. If the three capacitors had been equal capacitance (which is not the case), then the voltages across the capacitances would also have been equal in magnitude and phase, and no voltage would appear across the transformer primaries 31, 33 which bridge over between the intermediate points of the generated voltages and the intermediate points of the capacitors. However, capacitances 25, 26, 27 do not differ widely from one another, so that as a result there are small voltages across the primaries 31, 33. Primaries 31, 33 are low in impedance and therefore introduce impedances into the circuit which are small in relation to the reactance of capacitances 25, 26, 27, with the result that the currents through primaries 31 and 33 remain approximately in phase with each other for all values of the capacitance 26.

Now let it be assumed that transmitter capacitor 26 varies through a range of capacitances from a low limit which is approximately that of capacitor 25, through to a high limit which is approximately that of capacitor 27. Then it will be found that the current supplied to the primaries 31 and 33, and therefore the voltages generated in their secondary windings 42', 43', 44', 45', will closely follow the chart of Fig. 13 which represents the performance of similar secondaries in the circuit of Fig. 11. It is apparent therefore, that the secondaries in the circuit of Fig. 14 may be connected into a rectifier circuit and a ratiometer in the same manner as were the secondaries of Fig. 11, and with similar results.

In all of the preceding examples, full-wave bridge rectifier assemblies have been shown. It should be understood, however, that instead of full-wave bridge rectifiers, other systems are suitable for the purposes described.

Figure 15:
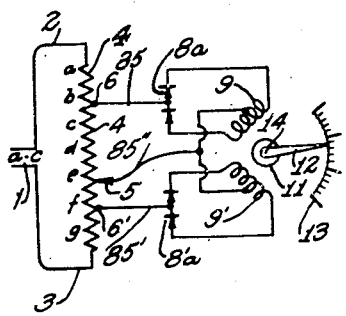
Fig. 15 shows another modification according to the invention, employing a different type of polarity-sensitive resistors.

Fig. 15 illustrates a circuit modified from Fig. 4, employing half as many rectifier elements together with split indicator coils 9 and 9'. In Fig. 15, a wire 85 connects tap 6 to the center terminal of a double half-wave rectifier stack 8a. The end terminals of this rectifier stack are connected to the end terminals of coil 9. Similarly, a wire 85' connects to the center terminals of a second double half-wave rectifier stack 8a', the end terminals of which are connected to the end terminals of coil 9'. Center taps on coils 9 and 9' are joined and connected to slider 5 by a wire 85'. In all other respects the circuit is similar to that of Fig. 4.

In operation, current flows in only one half of coils 9 and 9' at any one time, the particular value of current, and the particular half of each coil passing that current, being determined by the slider position. The magnetic flux from each coil passes through the same trends as the flux in the system of Fig. 4, and may be represented by Fig. 6 as was the magnetic flux in the circuit of Fig. 4. In addition to the variation of Fig. 15, there are of course other known rectifier circuits, all capable of accomplishing the same results as have been shown.

Figure 16:
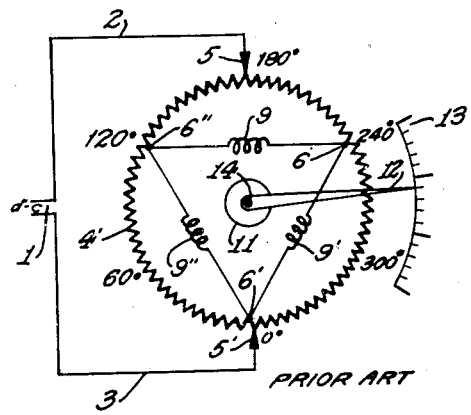
Fig. 16 shows a conventional circuit, employing a ring type resistance transmitter.

Thus far, many of the circuits which have been described for position indicators have been of the type that have a single trend for each coil current, and for which the locus of the resultant magnetic field vector H has been a straight line. These are not the only possible circuits however. There are numerous circuits employing ring transmitters of the resistance type and also many employing ring transmitters of the inductance type. Fig. 16 shows a circuit of a ring resistance type transmitter.

Referring to Fig. 16, which represents a prior art system it will be observed that the D.-C. source of electric energy 1 is connected by wires 2 and 3 across the diameter of a continuous ring resistance transmitter 4' by means of two sliding contacts 5, 5', which are caused to move as a unit (so that they always remain 180 degrees apart) by some external means such as a float, the position of which is to be indicated by the circuit system. Three taps 6, 6', 6'', equally spaced on the resistance ring 4', connect the ring to the three corners of a delta formed by coils 9, 9', 9''. The magnetic rotor 11, mounted on shaft 14, with attached pointer 12 is the same as before, and cooperates with scale 13.

Figure 17:
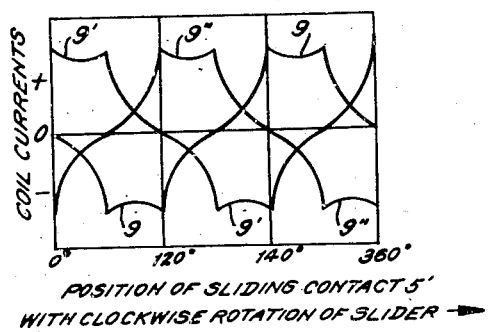
Fig. 17 shows the trend of current changes with slider position for Fig. 16.

As the sliders rotate together on the transmitter ring, the coil currents pass through changes as shown in Fig. 17 for sliding contact 5'.

Figure 18:
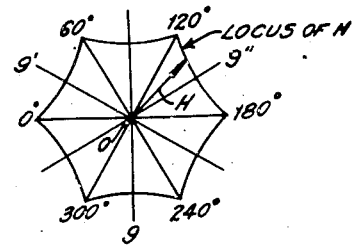
Fig. 18 shows the trends of the resultant magnetic flux controlling the rotor movement for Fig. 16.

Since the coils are assumed to be symmetrically disposed, 120 degrees apart, around the rotor, their magnetic vectors require to be placed 120 degrees apart also. Fig. 18 shows how the resultant magnetic vector H, taken at the center of the rotor space, forms a symmetriacl 6-sided figure. In Fig. 18, the characters 9, 9', 9'' indicate the axes along which the magnetic flux from the coils operate, these being 120 degrees apart. Coil currents determine the length of the vectors in these directions; and for each position of the sliders there is a combination of three currents shown in Fig. 17; and if these currents are each laid off along the axes 9, 9', 9'' and then added as vectors, the corresponding points on the locus will be obtained. The degrees of rotation of the sliders 5, 5' on the ring transmitter are marked as 0, 60, 120, etc., so that corresponding positions may be compared. The indicator pointer rotation and the rotation of the magnetic vector H, are not identical with these figures, but varies slightly from it in a manner not indicated here.

Figure 19:
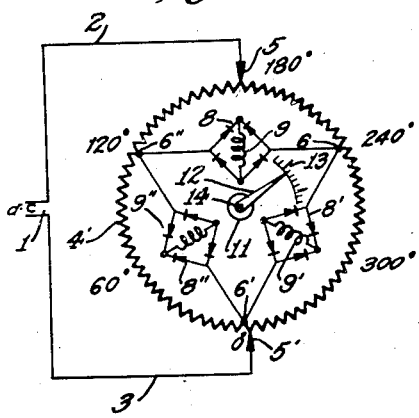
Fig. 19 shows a modification according to the invention for the circuit system of Fig. 16.
Figure 20:
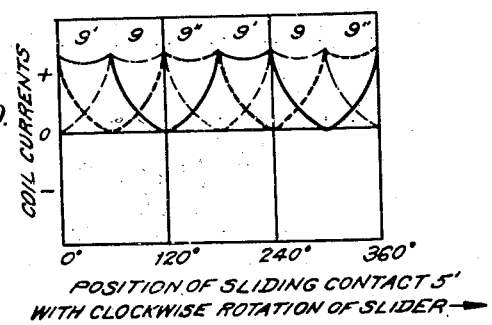
Fig. 20 shows the trends of current changes with slider position for Fig. 19.
Figure 21:
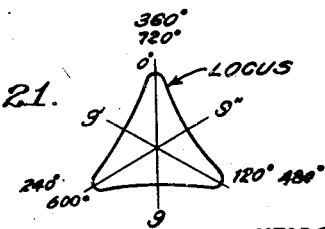
Fig. 21 shows the trends of the resultant magnetic flux controlling the rotor movement for Fig. 19.

Fig. 19 shows how this circuit may be modified to incorporate the features of the invention. The modified circuit is identical with that of Fig. 16, except that each coil 9, 9', 9'' is within a full wave bridge rectifier 8, 8', 8'' respectively. With this change in the circuit, the coil currents are not capable of reversing their direction in the manner shown in Fig. 17, but are instead required to remain in one direction, as shown in Fig. 20 for sliding contacts 5 and 5'. Fig. 20 may be derived from Fig. 17 by showing the magnitudes of the coil currents of Fig. 17 always in the positive direction, regardless of their sign in Fig. 17. A current pattern of this type will be found to furnish a magnetic vector locus as shown in Fig. 21. It is particularly to be noted that in Fig. 21 the locus is repeated twice; that is, the magnetic vector rotates through 720 degrees while the sliders have rotated 360 degrees.

It has been found that numerous circuit systems employing ring type transmitters of the resistance strip type can be equipped with polarity sensitive resistors such as rectifier elements; and that the polarity sensitive resistors will substantially increase the angular movement of the receiver as compared with systems without polarity sensitive resistors. If ring type transmitters of the inductance type are employed instead of ring type transmitters of the resistance strip type, the result will be the same; increased angular rotation of the receiver corresponding to a given movement of the transmitter the indication still being substantially insensitive to variations in the supply voltage.

The transmitters employed in the circuits which have been described are resistive, inductive, and capacitative in character; numerous variations of each type of transmitter as well as all other electrical transmitters are capable of being applied in combination with polarity-sensitive resistors to obtain the advantages described herein.

In the preceding explanations, the term "polarity-sensitive resistor" has been employed frequently to describe the circuit element around which all of the useful properties of the circuits have been built. It should be understood that this term is meant to include assorted varieties of dry-disc rectifiers, gas and vacuum tubes including those having control features, and also all devices having a voltage coefficient sufficient to permit operation as an automatic, voltage-operated switch. The advantages of the circuits described are most readily obtainable when the voltage-sensitive element changes its character at or near zero voltage, but may also be obtained when the voltage sensitive element changes its character at other voltages. Furthermore, a polarity-sensitive impedance such as an electrolytic condenser (which may also be considered to be a rectifier), or an inductor having a permanent-magnet core, are capable of being employed in circuits of the type described, to advantage.

The indicators employed in the circuits which have been described need not be of the types illustrated. For example, all crossed coil indicator instruments may be employed whether the coils are stationary or movable, and whether they are wound as a single coil or as a multiple coil as in Selsyn devices. They are characterized by requiring two or more currents for their operation, each of which varies in magnitude with changes in the supply voltage in the same proportion.

The circuits described herein have been selected from the simpler varieties that are possible through the application of the new circuit element. In addition to those described, numerous others have been designed and tried experimentally, for which the loci are four, five, and six sided figures instead of three sided figures. Furthermore, for each shape of locus, it has been found that there are numerous useful type of current variations that are obtainable, and that each type of current variation calls for a different circuit configuration. The circuit configurations which are claimed as new, however, all include polarity-sensitive impedances in combination with a receiver requiring two or more currents which must retain their relationship as the supply voltage varies.

While the invention has been described in detail with respect to certain preferred examples and embodiments, it will be understood by those skilled in the art after understanding the invention that various changes and modifications may be made without departing from the spirit and scope of the invention. It is intended, therefore, in the appended claims to cover all such changes and modifications.

What we claim is:

1. Control and indicating device comprising a transmitting means responsive to and controlled by a unit to be supervised, a receiving means of the ratiometer type including a plurality of coils and an indicating and control member, the relative position of the coils and the member being controlled by the relationship between energizing currents through the coils, a circuit means connecting the transmitting means and the receiving means for varying the relationship of the coil currents corresponding to the control of the transmitting means by the unit to be measured, polarity sensitive impedance means associated with each of said coils for changing the trend of the variations of the coil currents respectively caused by the transmitting means so as to change the relative position of the receiver member in response to a variation of the relationship of the coil currents, and resistance means connected in series with the polarity sensitive impedance means for further controlling the amount of change of the coil currents in response to a given variation of the transmitting means.

2. Control and indicating device comprising a transmitting means including a resistance means responsive to and controlled by a unit to be supervised, a receiving means including a plurality of coils and a magnetic member, the relative position of the member and the coils being controlled by the relationship between energizing currents through the coils, a circuit means including a source of current and means connecting the transmitting means with the receiving means for delivering signals from the transmitting means to the receiving means, a movable contact means connecting a part of the transmitter resistor with the circuit means, the position of the contact means on the resistance means being controlled by a change of the unit to be supervised thereby varying the relationship between energizing coil currents correspondingly, a rectifying means connected with each of said coils, and with parts of the transmitter resistance means for changing the trend of the variations of the coil currents caused by the transmitting means thereby changing the relative position of the receiver member in response to a given variation of the relationship of the coil currents.

3. Control and indicating device comprising a transmitting means including a transmitter resistance means responsive to and controlled by a unit to be supervised, a receiving means including a plurality of deflecting coils and an indicating and control member, the relative position of the member and said deflecting coils being controlled by the relationship between energizing currents through said deflecting coils, a circuit means including a resistor and a source of current for connecting the transmitting means with the receiving means to deliver signals from the transmitting means to the coils of the receiving means, a rectifying means connected with each of said deflecting coils and with fixed points on the resistor for changing the trend of the variations of the coil currents in said deflecting coils caused by the transmitting means thereby changing the relative position of the receiver member in response to a given variation of the relationship of the coil currents, and a movable contact means connecting the transmitter resistance means with the rectifying means, the piston of the contact means being controlled by a change of the unit to be supervised thereby varying the relationship between energizing coil currents correspondingly.

4. Control and indicating device comprising a transmitting means including a transmitter resistance means responsive to and controlled by a unit to be supervised, a receiving means including a plurality of coils and a movable indicating and control member, the relative position of the movable member being controlled by the relationship between energizing currents through the coils, a circuit means including a resistor and a source of current connecting the transmitting means with the receiving means for delivering signals from the transmitting means to the coils of the receiving means, a full-wave rectifier bridge associated with each coil for changing the trend of the variations of the coil currents caused by the transmitting means thereby changing the relative position of the receiver member in response to a given variation of the relationship of the coil currents, two terminals of each bridge being connected to the terminals of the respective coil, the third bridge terminal being connected to a part of the transmitter resistance means, and a movable contact means connecting a part of the transmitter resistance means with the fourth bridge terminal, the position of the contact means being controlled by a change of the unit to be supervised thereby varying the relationship between energizing coil currents correspondingly.

5. Control and indicating device as described in claim 11 in combination with an additional receiver coil connected in parallel with said transmitter resistance means.

6. Control and indicating device as described in claim 11 in combination with an additional receiver coil and a resistor in series therewith, both connected in parallel with said transmitter resistance means.

7. Control and indicating device as described in claim 11 in combination with a resistor connected in series with one of the rectifiers of the full-wave rectifier bridge.

8. An electric telemetering system adapted for use with both A.-C. and D.-C. current, comprising a transmitter including a potentiometer resistance connected across the current supply and having a variable contactor element the position of which is controlled mechanically in accordance with the magnitude of a condition, a receiver connected to said transmitter by at least three conductors, said receiver being of the ratiometer type and including at least two deflecting coils and a transversely magnetized rotor arranged to be controlled by the resultant of the flux of said coils, and rectifier means associated with each of said coils respectively for preventing any current flow therethrough except in respectively predetermined directions.

9. An electric telemetering system in accordance with claim 8, wherein each of said rectifier means is a full-wave bridge rectifier and wherein said coils are respectively connected across the D.-C. terminals of their associated rectifiers.

CLARENCE A. DE GIERS.
ABRAHAM EDELMAN.

REFERENCES CITED

The following references are of record in the file of this patent:

UNITED STATES PATENTS

| Number | Name | Date |
|---|---|---|
| 2,269,584 | Eldredge | Jan. 13, 1942 |
| 2,294,741 | Fisk | Sept. 1, 1942 |
| 2,330,588 | Jewell | Sept. 28, 1943 |
| 2,399,903 | Anderson | May 7, 1946 |

FOREIGN PATENTS

| Number | Country | Date |
|---|---|---|
| 401,150 | Great Britain | Nov. 9, 1933 |
| 636,862 | Germany | Oct. 16, 1936 |